Nov. 27, 1945.   A. M. JOHNSON   2,389,668
INDEXING MECHANISM FOR MACHINE TABLES
Filed March 4, 1943   2 Sheets-Sheet 1

INVENTOR
Albert M. Johnson
BY
Parker, Carton, Pinner & Hubbard
ATTORNEYS

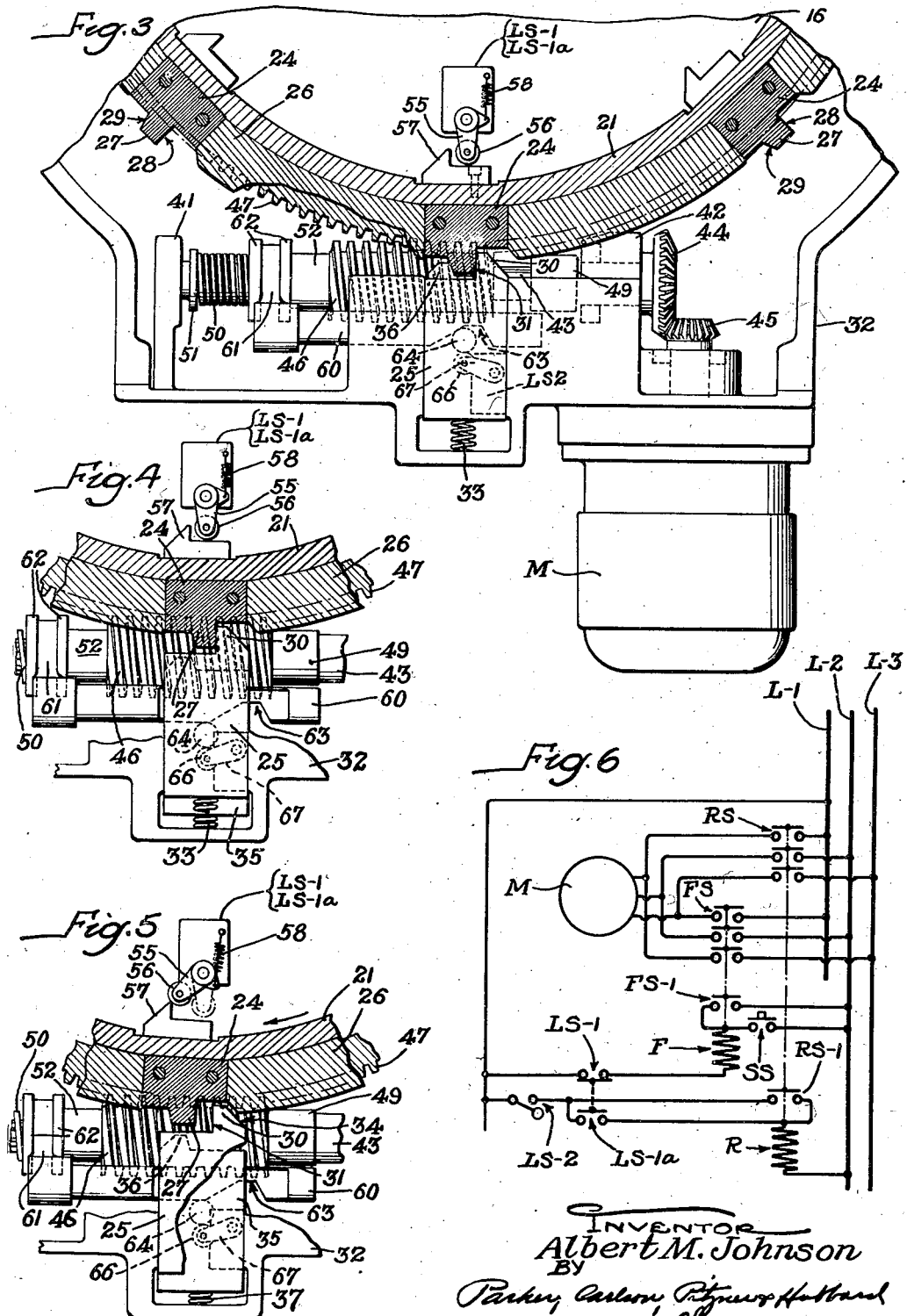

Patented Nov. 27, 1945

2,389,668

UNITED STATES PATENT OFFICE 2,389,668

INDEXING MECHANISM FOR MACHINE TABLES

Albert M. Johnson, Rockford, Ill., assignor to Barnes Drill Co., Rockford, Ill., a corporation of Illinois Application March 4, 1943, Serial No. 477,941

9 Claims. (Cl. 77—64)

The invention relates to indexing mechanism for translatable machine elements such as work tables.

Indexing work tables are used extensively with machine tool organizations of the type adapted to perform a plurality of operations upon workpieces. More specifically, such tables or supports are used to carry the workpieces through a series of stations at which the various machine operations are performed in succession. Thus the table may be arranged to carry a workpiece, to a drilling station, then to a reaming station, a tapping station, etc., at which these and other operations are performed according to the requirements of the particular work involved.

One object of the present invention is to provide an indexing mechanism for use with tables of the above general character which is operative both to shift the table for carrying the work from station to station and to accurately position the table and hold it so positioned while the operations are performed on the workpieces.

A more specific object is to provide novel indexing mechanism operative cyclically to advance a machine table slightly beyond an indexed position and then back the table against a fixed stop and hold it in abutment with the stop until the next indexing cycle is initiated.

A general object is to provide a direct electric drive for indexable machine tables which is simple in construction and efficient and reliable in operation.

Other objects and advantages will become apparent from the following detailed description of the preferred embodiment illustrated in the accompanying drawings in which:

Fig. 3 is a fragmentary sectional view of the table taken in a horizontal plane substantially on the line 3—3 of Fig. 2 showing the position of the various elements when the table is at rest.

Fig. 4 is a sectional view similar to Fig. 3 showing the position of the elements at the beginning of an indexing cycle.

Fig. 5 is a sectional view similar to Figs. 3 and 4 showing the position of the elements near the end of an indexing cycle.

Fig. 6 is a diagrammatic view of the operating and control circuits of the indexing mechanism.

Figure 1:
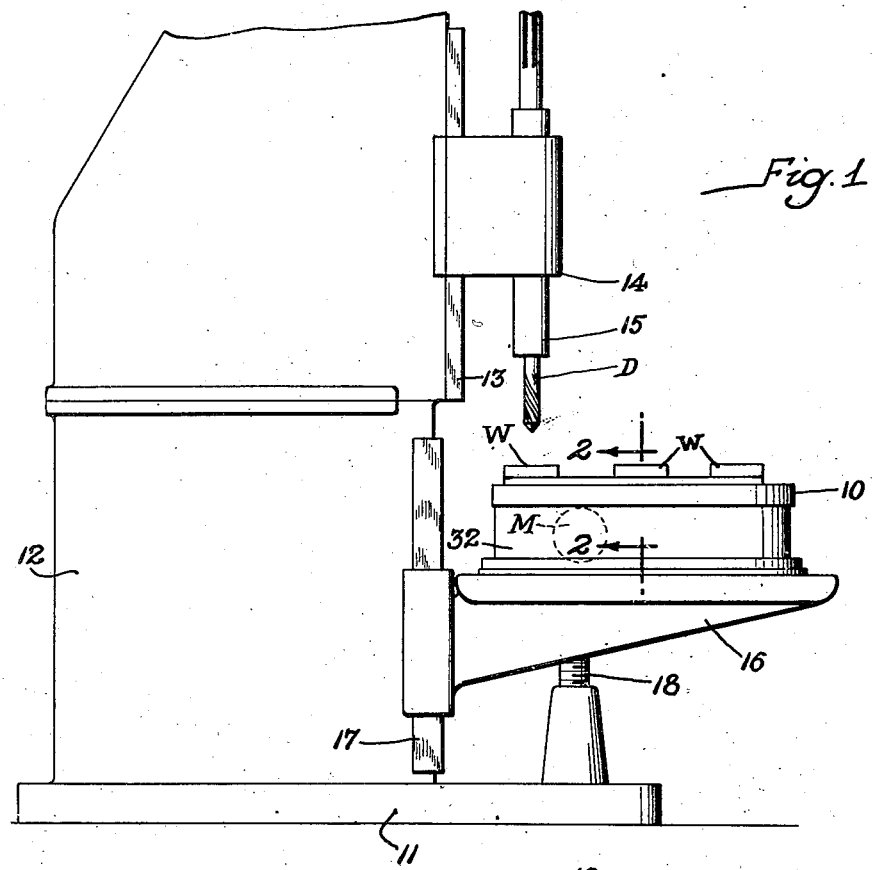
Figure 1 is a side elevational view of a machine tool structure having an indexable work table equipped with indexing mechanism embodying the features of the invention.

For purposes of illustration the invention has been shown and will be described herein as applied to an indexable work table of the rotating type. It will be understood, however, that the invention is not limited to use in the particular environment shown but that it may be readily applied to other types of work tables as well as to other translatable machine tool elements requiring periodic shifting from one place or station to another. It will also be understood that various changes and modifications may be made in the form, construction and arrangement of the parts without departing from the spirit and scope of the invention as expressed in the appended claims.

Referring to the drawings the improved indexing mechanism has been shown as applied to a generally circular work table 10 adapted to be rotated step-by-step to carry a plurality of workpieces W through successive stations at which various machining operations may be performed. For purposes of illustration the machine tool organization at one station has been shown. It will be understood, of course, that suitable apparatus for performing the required machine operations will be provided at the other stations.

The particular machine organization illustrated in Fig. 1 of the drawings is a drilling machine having a base 11 from which rises an upright column 12. Ways 13 on one face of the column support a tool head 14 for movement toward and from the table 10. The head, in this instance, is provided with a rotatable spindle 15 adapted to hold a drill D or other suitable tool for operating on workpieces W supported on the table 10. Any preferred means may be utilized for driving the tool spindle and for translating the head to advance and withdraw the tool.

Figure 2:
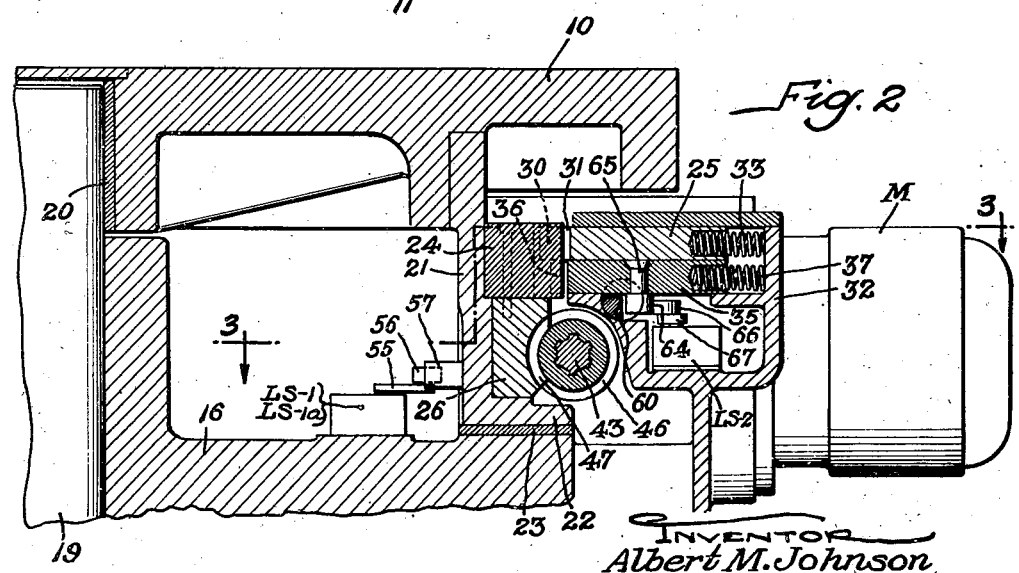
Fig. 2 is a fragmentary sectional view of the table taken in a vertical plane substantially on the line 2—2 of Fig. 1.

In the exemplary machine structure the work table 10 is supported on a saddle 16 adjustably mounted on vertical ways 17 formed on the face of the column 12 below the ways 13. Adjusting means such as a screw 18 is provided for raising and lowering the saddle. As shown in Fig. 2, the table 10 is mounted for rotation about a vertically disposed post 19 rigidly anchored at its lowered end on the saddle 16 and having its upper end projecting into a sleeve or bushing 20 seated in a central recess in the table. The weight of the table is supported by a depending annular bearing member 21 which may be integral with or rigidly secured to the underside of the table concentric with its rotational axis. The bearing member is preferably formed with a horizontal flange 22 at its lower end to provide a relatively wide bearing surface adapted to ride on a suitable bearing ring 23 carried on the saddle.

While the improved indexing mechanism may be utilized to impart steps any desired length to a table or other translatable machine element, the exemplary form shown is associated with a table arranged to be indexed through a complete revolution in eight equal steps. In other words, each indexing step advances the table through an angle of 45°. To accurately locate the table in each of the eight indexed positions, the table is provided with a series of locating members 24 adapted to coact successively with a fixed abutment or stop member 25 carried on the saddle. To insure the highest degree of accuracy in the positioning of the table, the stop and locating members are constructed and arranged to perform their table locating function in response to a reverse movement of the table. More specifically, provision is made for advancing the table slightly beyond the indexed positions and then reversing it to back the locating member against the stop.

The locating members 24 may be of any preferred construction and as herein shown are all alike. Each member comprises a generally rectangular body adapted to be seated in a notch in a driving ring 26 rigidly secured to the bearing member 21 in the position shown in Fig. 2 of the drawings. The member may be bolted or otherwise suitably secured to the ring. Projecting outwardly from the body portion of each member is a stop engaging member or lug 27 presenting a rearwardly facing shoulder 28 (Fig. 3) disposed substantially radially of the table. The opposite face of the lug is formed to provide a forwardly inclined cam surface 29 the purpose of which will appear presently.

The stop member 25, which coacts with the member 24 to accurately locate the table, comprises a flat, generally rectangular plate having a forwardly projecting nose portion 30 (Figs. 3–5) presenting a square shoulder 31 at one side edge. The plate is slidably supported and guided for movement toward and from the table whereby the shoulder 31 may be interposed in or withdrawn from the path of the shoulder 28. To this end the plate is mounted in a horizontal guideway formed in a housing 32 located at one side of the table and comprising, in this instance, a part of the saddle 16. A compression spring 33 acting on the rear end of the plate yieldably urges it toward the table or into the blocking position. To permit the lugs 27 to pass the projecting nose 30 as the table is indexed to successive positions, the rear face of the nose is formed with an inclined cam surface 34 adapted to be engaged by the cam surface 29 in the forward movement of the table. The cam surface is thus effective to cam the stop member back against the action of the spring 33 to provide clearance for the lug. When the lug has passed the nose 30, the stop member immediately shifts back to blocking position.

Means is provided for holding the lug 27 in abutting relation with the nose portion 30 of the stop member so as to maintain the table accurately located at each index position. This means, as herein shown comprises, a flat generally rectangular locking plate 35 (Figs. 2 and 5) slidably supported in the housing 32 below the stop member 25 for movement toward and from the table. At its inner end, the plate 35 is formed with a forwardly projecting lug 36 having an inclined cam face adapted to coact with the cam surface 29 of the lug 27. A compression spring 37 (Fig. 2) presses the plate forwardly toward the table and the engagement of the cam surfaces is then effective to yieldably urge the table rearwardly (in a counterclockwise direction as viewed in Figs. 3–5) thus maintaining the stop shoulders 28 and 31 in contact.

The invention provides novel power actuated drive mechanism for intermittently advancing the table and for imparting reverse movement thereto after each advance or indexing step to effect the accurate positioning of the table through the action of the stop mechanism above described. The drive mechanism preferably comprises a reversible electric motor M, herein shown as mounted at one side of the housing 32 (Figs. 2 and 3). The motor is connected with the table by driving means which is positive acting when the motor is running in one direction and yieldable when the motor is running in the other direction. Rotatably supported within the housing 32 in bearings 41 and 42 is a shaft 43 disposed tangentially of the table bearing member 21. The shaft is adapted to be driven by the motor M through the medium of a bevel gear 44 keyed on one end of the shaft and meshing with a bevel pinion 45 fast on the motor shaft.

Splined on the shaft 43 is a worm 46 adapted to mesh with worm wheel teeth 47 formed in the outer periphery of the driving ring 26 which, as previously stated, is rigidly secured to the table bearing member 21. Due to the splined connection between the worm 46 and the shaft 43, the worm is forced to rotate with the shaft but is permitted to move axially thereon. Axial movement of the worm toward the driven end of the shaft is limited by a collar 49 rigid with the shaft.

Axial movement of the worm 46 away from the collar 49 is resisted by a relatively heavy compression spring 50 (Fig. 3) interposed between a shoulder 51 on the shaft and a sleevelike extension 52 on the adjacent end of the worm. The spring 50 is tensioned so as to urge the worm against the collar 49 while permitting axial movement thereof when sufficient force is exerted to overcome the pressure of the spring. When the shaft 43 is started in rotation in a forward direction (clockwise as viewed in Fig. 2) with the table at rest and the worm positioned as shown in Fig. 3, the worm rides over the worm wheel teeth until it meets the collar 49 which prevents further axial movement along the shaft. Continued rotation of the shaft and worm is then effective to advance the table in a forward direction so as to carry the workpiece from one operating station to the next.

Rotation of the shaft 43 in the opposite direction acts to shift the table reversely until the resistance offered to such movement exceeds the force exerted by the spring 50. Thus, when the table is positively blocked against reverse movement by the stop member 25, the worm rides over the worm wheel and shifts axially along the shaft thus compressing the spring 50. If the driving motor is stopped with the spring 50 compressed, the force exerted through the worm and worm wheel teeth is effective to hold the table securely against the stop and thus accurately locate the table with respect to the machine stations.

In the exemplary machine each indexing cycle is started manually and provision is made for automatically controlling the reversal and stopping of the driving motor to effect the accurate positioning of the table as above described. The reversal of the motor is effected, in this instance, by switch means operable in response to the movement of the table through a predetermined distance. Other switch means is provided for stopping the motor after a predetermined interval of reverse operation.

Referring to Fig. 6 of the drawings, the motor M is adapted to be connected with a power line comprising conductors L—1, L—2 and L—3 by either of two switches FS or RS. With switch FS closed, current is supplied to the motor to drive it in a forward direction, that is, in a direction to advance the table from one station to another. Closure of the switch RS reverses the connection of the motor to the power line and thus reverses the running direction of the motor and consequently the direction of the table movement. The switches RS and FS are adapted to be closed respectively by forward and reverse solenoids F and R.

When the table is at rest, as during a machining operation, with the various elements occupying the positions shown in Fig. 3 of the drawings, an indexing cycle is initiated by momentary closure of a manually operable start switch SS. This switch completes an energizing circuit for the forward drive solenoid F which, accordingly, closes the motor switch FS to start the motor in a forward direction. The solenoid F additionally closes a holding switch FS—1 which acts to maintain the solenoid energized after the starting switch is released. The circuit of the solenoid F also includes a normally closed limit switch LS—1 adapted to be opened automatically as the table completes an indexing step.

As the shaft 43 starts rotating in a forward direction, the worm 52 rides along the worm wheel teeth 47 toward the driven end of the shaft until the worm engages the shoulder 49. Thereafter the table is positively advanced a predetermined distance. As the table approaches the end of an indexing step, the cam surface 29 of the lug 27 cams the stop member 25 rearwardly to allow the lug 27 to pass. In practice the table is advanced slightly beyond the indexed position as shown in Fig. 5 before the forward running circuit of the motor is interrupted. The motor is then reversed to turn the table back to the desired position. Interruption of the forward running circuit is effected by the limit switch LS—1 previously mentioned while the reversal is effected by a companion limit switch LS—1a. These limit switches are enclosed in a suitable casing adapted to be mounted on the saddle 16 adjacent the inner face of the table bearing member 21. The switches are provided with a common actuator in the form of a pivoted arm 55 having a follower roller 56 positioned for engagement by cam blocks 57 carried on the member 21. A spring 58 normally holds the arm 55 in the position shown in Figs. 3 and 4 of the drawings in which position the switch LS—1 is closed and switch LS—1a is opened.

One of the cam blocks 57 is provided for each indexed position of the table and is mounted on the member 21 at the rear of the stop engaging member 24. Preferably, the high point on the cam block is positioned to engage the roller 56 and open the switch LS—1 just after the table locating lug 27 passes the nose portion 30 of the stop member. The opening of the switch LS—1 causes the solenoid F to become deenergized and the resultant opening of the switch FS—1 interrupts the holding circuit of the solenoid so that reenergization can be effected only by closure of the start switch SS. Motor switch FS is also opened to interrupt the forward running circuit of the motor.

Limit switch LS-1a is timed to close immediately following the opening of the switch LS—1. Closure of this switch completes an energizing circuit for the solenoid R which, upon energizing, closes the reverse running switch RS and also a holding switch RS—1. The latter switch acts to maintain the solenoid energized when the switch LS—1a is opened as the cam block 57 advances beyond the switch actuating arm and permits the arm to return to the normal position as shown in broken lines in Fig. 5.

The holding circuit for the solenoid R includes a limit switch LS—2 adapted to be actuated in response to axial shifting of the worm 46 on the shaft 43. The switch actuating means, as herein shown, comprises a cam bar 60 extending generally parallel to the shaft 43 and slidably supported for endwise movement in suitable guides in the housing 32. The cam bar is connected to move axially with the worm by means of a yoke 61 slidably straddling the sleeve portion of the worm and confined between spaced collars 62 integral with the sleeve. As shown in Figs. 2, 4 and 5, the upper surface of the cam bar is recessed so that it can fit snugly under the locking plate 35 and the outer edge portion of the bar is notched as at 63 for the reception of a follower roller 64 journalled on a stud 65 projecting from the lower face of the plate. The roller 64 also coacts with a roller 66 carried on the free end of an actuator arm 67 adapted to actuate the switch LS—2.

The arrangement of the cam bar and actuator mechanism is such that the roller 64 rides over the unnotched edge portion of the cam bar when the worm is in the table driving position, that is, in abutting relation with the collar 49 of the shaft. The locking plate 35 is therefore cammed back against the action of the spring 37 so that the lug 36 is withdrawn from the path of the lug 27. The switch arm 67 is held in the position shown in broken lines in Figs. 4 and 5 and, in this position, the switch LS—2 is closed. Accordingly, during the advance of the table the energizing circuit for the solenoid R is conditioned so that the solenoid may be energized by closure of the limit switch LS—1a.

Reversing of the motor M by closing of the switch LS—1a as above described, is timed to take place substantially at the instant the table reaches the position shown in Fig. 5. The solenoid R is energized and locks up before the actuator arm is released but forward movement of the table continues at least long enough for the cam block to clear the actuator arm. With solenoid R energized, the table is driven reversely until the shoulder 28 of the table locating lug engages the stop shoulder 31 of the member 25 thus positively blocking any further reverse movement of the table. Continued rotation of the drive shaft 43 therefore forces the worm 46 to ride over the worm wheel teeth 47 and compress the spring 50.

The cam bar 60 is carried along with the worm during a predetermined interval of reverse operation of the drive mechanism, that is, until the roller 64 drops into the notch 63 due to the action of the spring 37 on the locking plate 35. In this forward movement of the locking plate, the limit switch LS—2 is opened to interrupt the circuit for the solenoid R which becomes deenergized and opens the reverse running switch RS to stop the motor. The opening of the switch LS—2 is timed to occur when the parts occupy substantially the position shown in Fig. 3. In other words, the motor is stopped when the spring 50 has been tensioned sufficiently to hold the table locating lug securely against the stop and thus maintain the table accurately located through the machining operation which follows the indexing cycle.

It will be observed that the locking plate 35 is advanced to locking position only when the table has been backed up against the stop 25. As previously explained, the cam action of the lug 36 on the cam surface 29 of the table locating lug 27 assists the spring 50 in holding the table accurately positioned. The locking plate incidentally, is adapted to perform this function independently of the spring 50 in the event that the worm works back along the shaft due to vibration or any other cause.

The operation of the improved indexing mechanism is briefly as follows: Assume by way of illustration that the table is to be shifted from the position in which it is shown in Fig. 3 into the next adjacent indexed position. The attendant initiates the indexing cycle by momentary actuation of the starting switch SS which energizes the solenoid F. The solenoid locks up and starts the motor M running to drive the worm shaft 43 in a forward direction. In the initial rotation of the shaft, the worm 46 threads over the worm wheel teeth 47 shifting axially toward the driven end of the shaft until blocked by the collar 49. The cam bar 60 moves axially with the worm and cams back the locking plate 35 to free the stop lug 27 for forward movement. Further, the cam bar closes the limit switch LS—2 to prepare the circuit for the reversing solenoid R.

When the axial movement of the worm is blocked as above described, the worm acts to positively advance the table. Such advance continues until the stop engaging lug 27 at the next adjacent table position has passed the stop member 25. In passing, the lug cams back the stop member which is subsequently projected back into the path of the lug by the action of its associated spring. Shortly after the lug has passed the stop member, the cam block 57 opens the limit switch LS—1 to interrupt the circuit of the solenoid F which becomes deenergized and opens the forward running circuit of the motor. The cam block 57 also momentarily closes the limit switch LS—1a to energize the solenoid R which locks up as previously explained and closes the reverse running circuit of the motor M.

Reverse rotation of the worm 46 drives the table rearwardly until the shoulder 28 of the stop engaging lug abuts against the stop shoulder 31 of the stop member 25 which blocks the table against further rearward movement. The motor, however, continues to run and the worm threads over the worm wheel teeth 47 shifting axially to compress the spring 50. Cam bar 60 moves to the left with the worm and, after a predetermined interval of reverse operation, opens the limit switch LS—2 and permits the locking plate to move forwardly to locking position. Opening of the limit switch stops the motor and thus terminates the indexing cycle.

Upon completion of the indexing cycle, the table remains stationary while the various operations are performed on the workpieces carried by the table. The table is held accurately in its indexed position due to the force exerted by the spring 50 acting through the worm 46 and worm wheel teeth 47. This force is applied in a direction effective to force the stop engaging or locating lug 27 tightly against the stop shoulder of the member 25 so that accidental displacement of the table is effectually prevented. The accurate locating of the table is also assisted by the locking plate 35 which acts to cam the lug 27 rearwardly against the stop shoulder.

It will be apparent from the foregoing that the invention provides an indexing mechanism of novel and advantageous construction for use with work supporting tables or similar translatable machine elements. Accurate location of the table is insured by arranging the mechanism to advance the table slightly beyond the indexed position and then back it up against a fixed stop or abutment. The novel drive mechanism provided for this purpose includes a driving connection arranged for positive action in one direction while yielding in the other direction, and the yielding of the driving connection is utilized to hold the table securely in the indexed position. Control of table movements is effected automatically by the starting, stopping and reversing of the table driving motor thus eliminating clutches or the like which are subject to excessive wear. The elimination of a clutch together with the simple, rugged construction of the improved mechanism makes it efficient and reliable in operation and materially prolongs its useful life.

While the invention has been illustrated and described in connection with a work table adapted to be indexed in steps of uniform length, it is readily applicable to tables or other translatable machine elements requiring non-uniform indexing. This is for the reason that the length of the step imparted to the table is determined solely by the positioning of the control devices and locating elements which govern the operation of the table driving motor. The improved indexing mechanism therefore has a wide range of adaptability.

I claim as my invention:

1. Mechanism for indexing a machine table comprising, in combination, a worm wheel rigid with the table, a reversible electric motor, means including a worm engageable with said worm wheel operative to provide a driving connection between said motor and the table, said worm being adapted to advance the table when the motor is running in one direction and to travel along the worm wheel when the motor is running in the other direction and the table is blocked against movement, switch means operable to start the motor running in said one direction, other switch means operable in response to the movement of the table through a predetermined distance for reversing said motor, means operative to block the reverse movement of the table whereby said worm is caused to travel along the worm wheel, and means actuated by said worm in response to its movement along said worm wheel for stopping said motor.

2. The combination with a shiftable machine table, of mechanism for indexing the table comprising, a worm wheel rigid with the table, a shaft rotatably supported adjacent the worm wheel, a reversible motor arranged to drive said shaft, a worm splined on said shaft and engageable with said worm wheel, said shaft having a shoulder effective to limit the movement of the worm on the shaft in one direction to enable the worm to positively drive the table when the shaft is driven in one direction, spring means yieldably urging said worm toward said shoulder, said spring yielding to permit limited movement of the worm axially of the shaft when the latter is driven in the opposite direction and the table is blocked against movement, and control means actuated by the axial shifting of said worm for stopping said motor.

3. The combination with a shiftable machine table, of mechanism for indexing the table comprising, a worm wheel rigid with the table, a shaft rotatably supported adjacent the worm wheel, a reversible motor arranged to drive said shaft, a worm splined on said shaft and engageable with said worm wheel, a collar on said shaft effective to permit axial movement of the worm in one direction, spring means positioned to resist said axial movement of the worm, stop means positioned to block the table against movement in one direction whereby said worm is caused to travel along the worm wheel against the action of said spring, and means for stopping said motor after a predetermined movement of the worm, said spring acting through the worm to yieldably hold the table against said stop.

4. A combination with a shiftable table, of mechanism for indexing the table comprising, a stationarily supported stop member, a stop engaging member mounted on the table, said stop member being yieldable to allow the stop engaging member to pass when the table is moved in one direction and effective to block the stop engaging member and the table against movement in the opposite direction, a reversible electric motor arranged to drive the table, switch means operable to start the motor for driving the table in said one direction, other switch means operable immediately after the passing of the stop member by the stop engaging member for reversing said motor to thereby drive the table in the opposite direction until blocked by the engagement of said members, and means operable in response to the blocking of the table for stopping said motor.

5. The combination with a rotatable machine table, of mechanism for indexing the table comprising a reversible motor connected to drive the table either forwardly or reversely, a fixed stop, a plurality of stop engaging members mounted on the table and adapted to coact with said fixed stop to locate the table at successive indexed positions, control means operable to start the motor running in a direction to advance the table, other control means operable to reverse said motor in response to the movement of the table through a distance sufficient to carry one of the stop engaging members past said stop, said motor acting to drive the table reversely until interrupted by engagement of the fixed stop by said one stop engaging member, and means operated in response to the interruption of the reverse table movement for stopping said motor.

6. The combination with a rotatable machine table, of mechanism for indexing the table to and locating it in successive indexed positions comprising, a motor operative to drive the table either forwardly or reversely, a shiftable stop member located adjacent the table, a plurality of stop engaging members uniformly spaced around the table, means yieldably urging said stop member into the path of said stop engaging members whereby to block reverse movement of the table, said stop engaging members being shaped to cam the stop member out of blocking position in the forward movement of the table, a shiftable member positioned to coact with the stop engaging member blocked by said stop member, and spring means acting on said shiftable member to yieldably hold the stop engaging member against said stop to maintain the table accurately located at an indexed position.

7. A combination with a translatable machine table, mechanism for indexing the table comprising, a reversible motor, means providing a driving connection between said motor and the table, said driving connection being positive acting when the motor is running in one direction and yieldable when the motor is running in the other direction, switch means operable to start the motor running in said one direction, means operable in response to the movement of the table through a predetermined distance for reversing the motor, stop means operative to block the table against reverse movement, said connecting means yielding in response to the reverse running of the motor, and means actuated in response to the yielding of said driving connection for stopping the motor.

8. The combination with a shiftable work supporting table, of mechanism for indexing the table comprising, a reversible electric motor, means providing a driving connection between said motor and said table, switch means operable to start the motor for driving the table in one direction, other switch means operable in response to the movement of the table for reversing said motor to thereby initiate the driving of the table in the opposite direction, and means actuated by said driving connection for stopping the motor after a predetermined interval of reverse operation.

9. The combination with a shiftable work supporting table, of mechanism for indexing the table comprising, a reversible electric motor connected for driving the table, switch means operable to start the motor for driving the table in one direction, means operative in response to the movement of the table through a predetermined distance for reversing the motor to thereby initiate the driving of the table in the opposite direction, and means actuated by the motor after a predetermined interval of reverse operation for stopping the motor.

ALBERT M. JOHNSON.